United States Patent [19]

Tominaga et al.

[11] 4,327,812
[45] May 4, 1982

[54] REAR ARM BEARING STRUCTURE FOR MOTORCYCLE

[75] Inventors: Nobuyoshi Tominaga, Hamamatsu; Nobuyoshi Kurai, Iwata; Hajime Ueno; Sadahide Suzuki, both of Shizuoka, all of Japan

[73] Assignee: Yamaha Hatsudoki Kabushiki Kaisha, Iwata, Japan

[21] Appl. No.: 132,373

[22] Filed: Mar. 21, 1980

[30] Foreign Application Priority Data

Mar. 29, 1979 [JP] Japan .................................. 54-36296

[51] Int. Cl.³ ............................................. B62K 11/04
[52] U.S. Cl. .................................................. 180/226
[58] Field of Search .................... 180/226, 227, 73 R, 180/73 C, 73 D, 73 TL, 73 TT

[56] References Cited

U.S. PATENT DOCUMENTS 2,077,628  4/1937  Jordan ................................. 180/226
3,877,539  4/1975  Tilkens ................................ 180/227

FOREIGN PATENT DOCUMENTS 1133249  3/1957  France ................................ 180/226
752035   6/1954  United Kingdom ................ 180/226
735618   8/1955  United Kingdom ................ 180/226

*Primary Examiner*—Joseph F. Peters, Jr.
*Assistant Examiner*—Randall A. Schrecengost
*Attorney, Agent, or Firm*—Donald D. Mon

[57] ABSTRACT

A motorcycle has a front frame, and a rear arm pivotally mounted to the frame for mounting the rear wheel. The rear wheel is driven by a propeller shaft that has a universal joint intersected by the axis of a bearing structure which mounts the rear arm. The bearing structure which mounts the rear arm lies inboard of the propeller shaft, whereby to enable reduction of the widthwise dimension of the motorcycle, and to enable a lighter-weight assembly of this portion of the motorcycle to be utilized, because it is unnecessary to bifurcate the bearing structure or to place part of it laterally outside of the propeller shaft.

5 Claims, 4 Drawing Figures

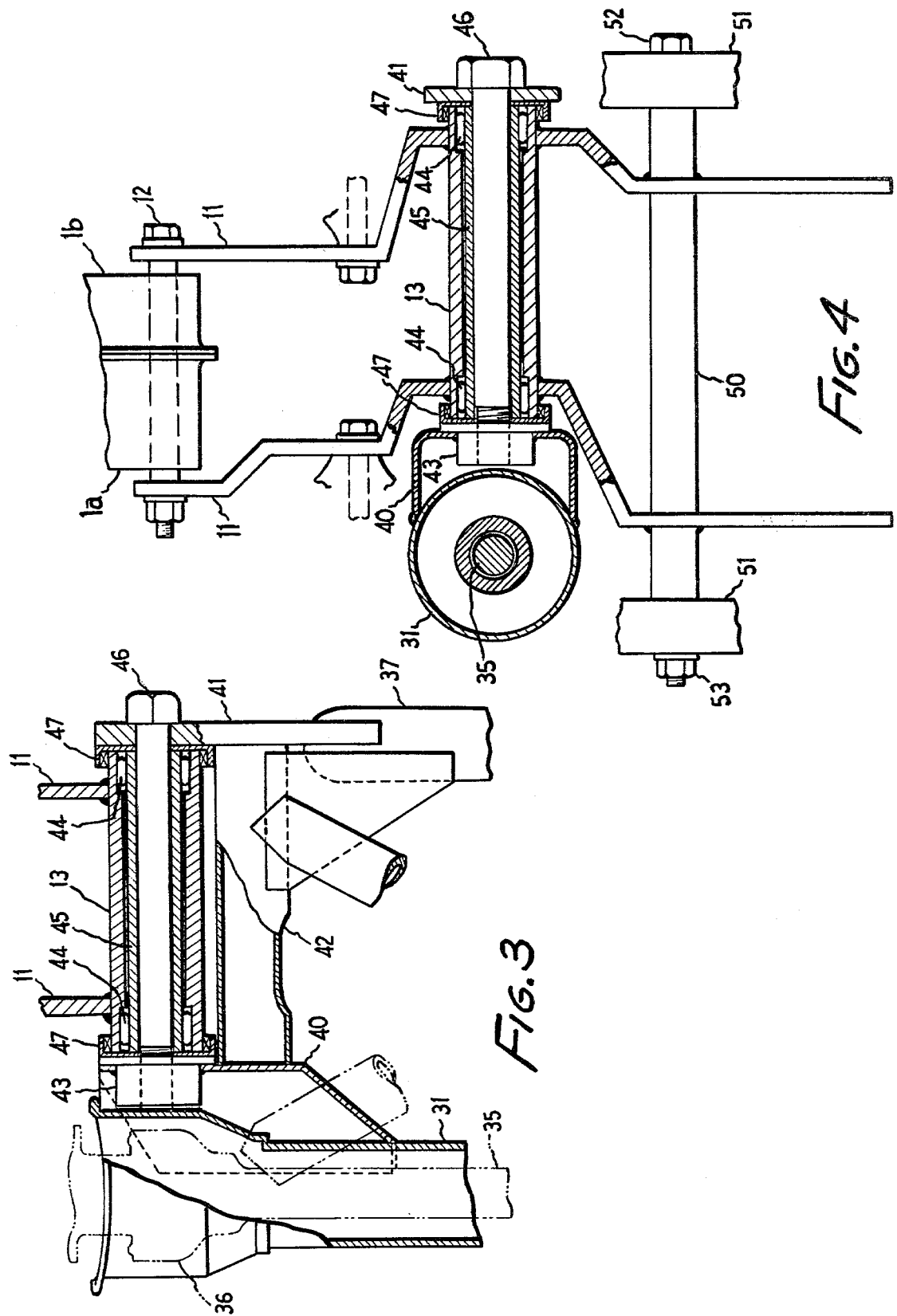

REAR ARM BEARING STRUCTURE FOR MOTORCYCLE

FIELD OF THE INVENTION

The present invention relates to a rear arm bearing structure for a motorcycle of the shaft drive type, in which an engine output is transmitted to a rear wheel shaft through a propeller shaft.

BACKGROUND OF THE INVENTION

In a motorcycle of the shaft drive type, it is conventional practice for a propeller shaft case to act as one element of a rear arm to which the rear wheel is mounted. In this situation, the frame of the motorcycle is bifurcated whereby to interpose the front end of the rear arm inbetween. It is a requirement that the universal joint of the propeller shaft be disposed substantially on the center line of the bearings that connect the rear arm to the frame. This is because the relative positions between the propeller shaft and the rear arm must be invariable when the rear wheel moves up and down and the rear arm is rocked back and forth. As in a chain drive system, a supporting member extending between the right and left frames for supporting the pivot shaft of the rear arm cannot be provided because it would cause interference with the propeller shaft. As a result, because the supporting member has to be divided into halves at the right and left sides of the frame and still has to be able to support the rear arm in its divided form, a very high strength is required to be provided by the supporting structure.

On the other hand, a motorcycle must be narrow as possible so as to reduce its sidewise (widthwise) protrusion. However, the position of the propeller shaft in the widthwise dimension of the motorcycle body is determined by its relationship with the rear wheel. Therefore, according to the conventional construction in which both ends of the rear arm are interposed between the frame halves, the width of the motorcycle is accordingly increased when the mounting portion of the frame is located outside (laterally away from the forward axis of the frame) of the propeller shaft, so that the objective of narrowing the motorcycle is frustrated.

BRIEF DESCRIPTION OF THE INVENTION

It is an object of the present invention to provide a rear arm bearing structure for a motorcycle which does not need to have such a high strength in the widthwise direction of the motorcycle body as structures in the prior art, while enabling reduction of the width of the motorcycle body itself. In order to attain this objective, the present invention is characterized in that the bearings which mount the rear arm are arranged laterally inside of the propeller shaft.

The invention will be fully understood from the following detailed description and the accompanying drawings, in which:

BRIEF DESCRIPTION OF THE DRAWINGS

FIG. 3 is a partially sectional top plan view showing a portion in an enlarged scale; and FIG. 4 is a partially sectional back elevation taken in FIG. 1.

DETAILED DESCRIPTION OF THE INVENTION

Figure 2:
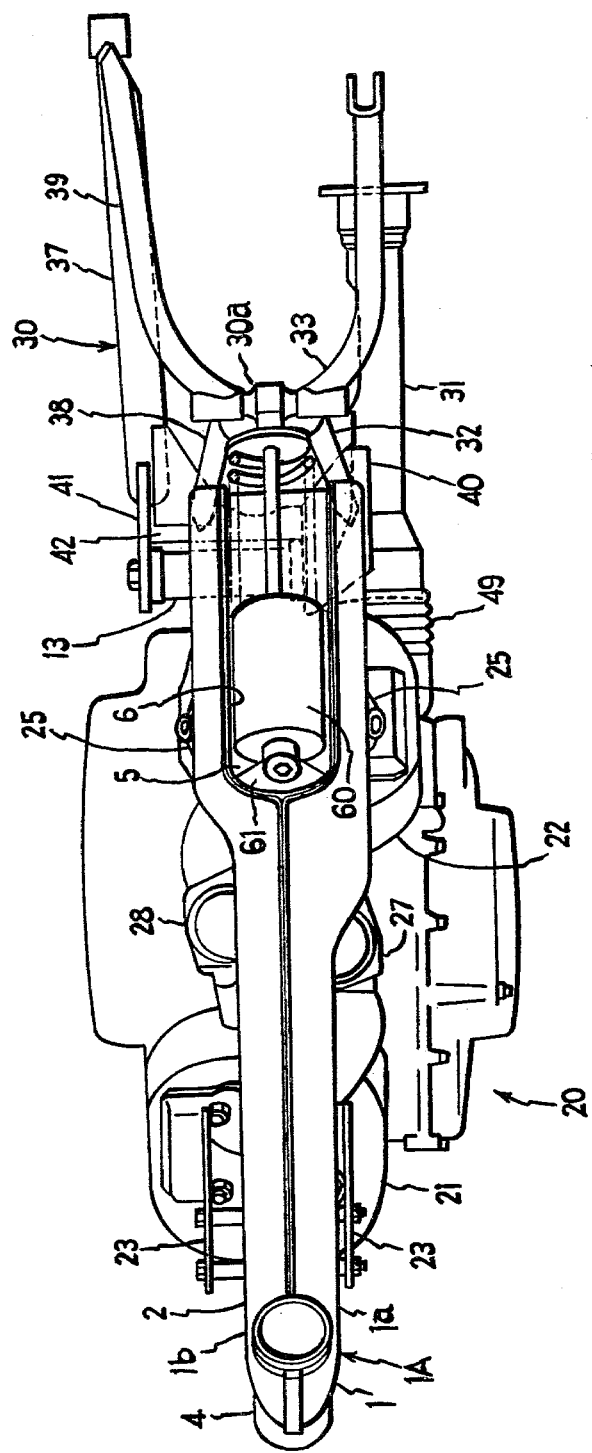
FIG. 2 is a top plan view of FIG. 1.

In the Figs., reference numeral 1 indicates a main frame which has a generally box-shaped cross-section created by joining right and left metal plate members 1a and 1b. Main frame 1 thus made is formed with a tank rail portion 2 and a bent portion 3 in the vicinity of the rear end of the tank rail portion. To the front end of the tank rail portion 2, there is welded a steering head pipe 4. The tank rail portion 2 is bifurcated from the rear half thereof to above the bent portion 3. The bifurcation accommodates a suspension 5. More specifically, the aforementioned respective metal plate members 1a and 1b are slightly bulged in the widthwise dimension of the motorcycle body, from the rear half of the tank rail portion 2 to the bent portion 3, while their inner walls depart from one another, and their inside opening is closed by welding a liner 6 thereto. As a result, liner 6 accommodates suspension 5 (as shown in FIG. 2).

Figure 1:
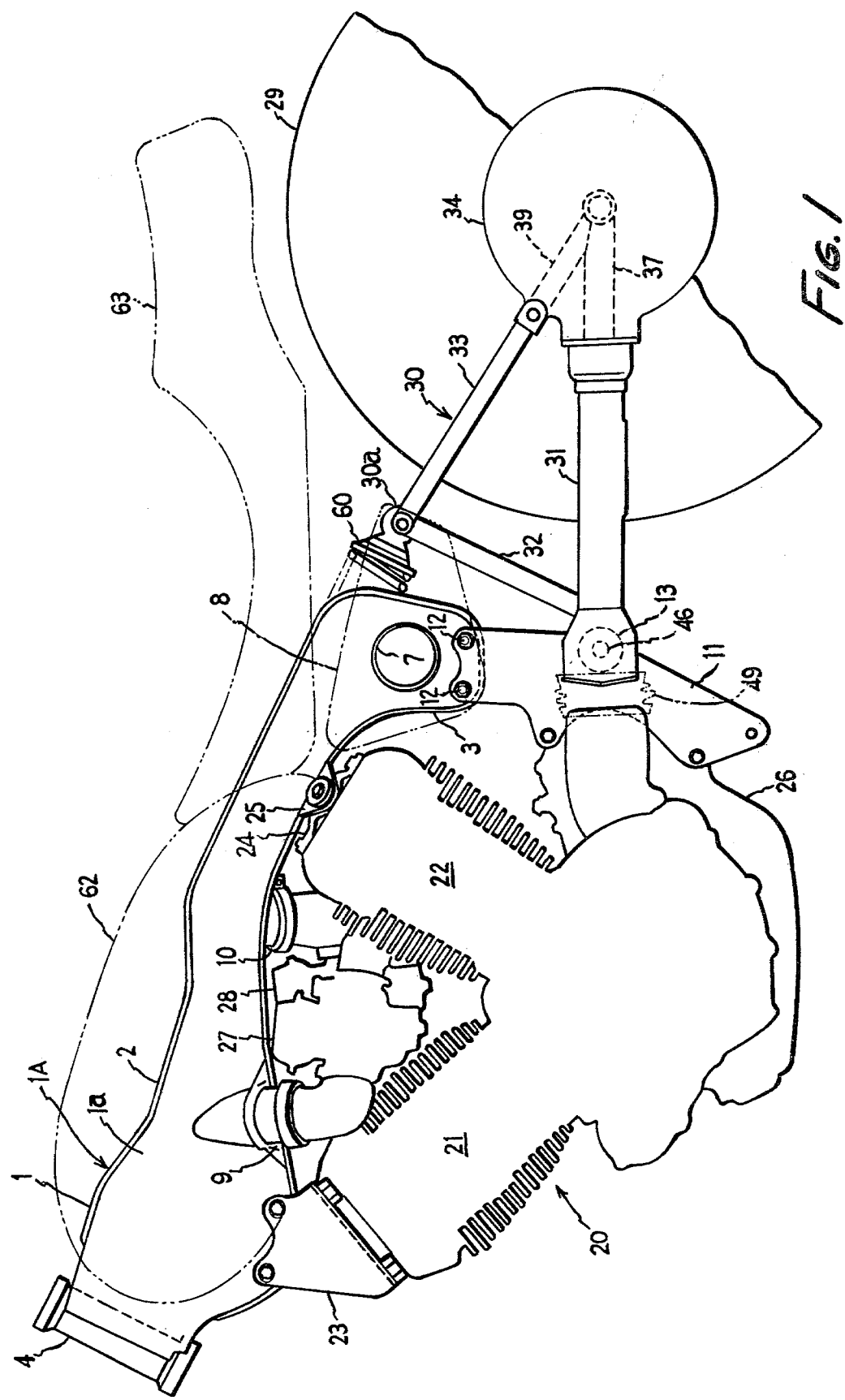
FIG. 1 is a side elevation showing the presently preferred embodiment of the invention with some parts eliminated for clarity.

Right and left metal plate members 1a and 1b are attached to each other at the lower portion of the bent portion 3. Metal plate member 1a is formed with a round opening 7 at its position corresponding to the bent portion 3. In FIG. 1, reference numeral 8 indicates an air cleaner which is disposed to the side of that opening 7. As a result, ambient air is introduced from the opening 7 into the main frame 1 through the air cleaner 8. Reference numerals 9 and 10 indicate intake pipes that are mounted in the tank rail portion 2, so that the air entering opening 7 is sucked from those intake pipes 9 and 10 through the main frame 1 into the respective cylinders of an engine 20, which will be described later.

Reference numerals 11 indicate a pair of right and left brackets, which are firmly fixed to the main frame 1 in a manner to depend from the bent portion 3 by means of two bolts 12 and nuts. As a result, those brackets 11 become substantially integral with the main frame 1 so that they constitute a frame 1A. The term "bracket" as used herein is intended to denote an element adapted to receive and support the bearing—one at each side of the motorcycle. It is not intended to be limited to a separate piece of metal attached to a frame, but is intended to comprehend all structures that are part of or are rigidly attached to the frame so that attachment to them is directly or indirectly attachment to the frame itself. A bearing pipe 13 is fixed to the left brackets 11. It has a cylindrical shape, and extends through the brackets. Bearing pipe 13, thus fixed, is the aforementioned supporting member which is made to extend between the bifurcated portions of the frame so as to support the pivot shaft of a rear arm 30, as will be described later. This rear arm 30 is connected in a rotatable manner to bearing pipe 13.

Reference numeral 20 is a V-shaped engine, the respective cylinders 21 and 22 of which are mounted in tandem. To the cylinder head of the front cylinder 21, more specifically, there is fixed a generally channel-shaped bracket 23 such that its both sides straddle tank rail portion 2 of main frame 1. Bracket 23, thus fixed, is additionally fixed to the front portion of the tank rail portion 2 through a collar.

To the cylinder head of the rear cylinder 22, there is fixed a bracket 24 which is formed with right and left mounting sides that are inclined downward. To the main frame 1, there are fixed a pair of right and left brackets 25 which are arranged to face the mounting sides of bracket 24. These brackets 24 and 25 are elastically connected through a rubber bush (not shown). On the other hand, the crankcase 26 of engine 20 is fixed at its rear portion to the aforementioned brackets 11.

Reference numerals 27 and 28 indicate a pair of left and right carburetors, of which the lefthand carburetor 27 is placed between the aforementioned intake pipe 9 and rear cylinder 22 and the righthand carburetor 28 is placed between the intake pipe 10 and the front cylinder 21.

A rear wheel 29 is mounted to rear arm 30. Rear arm 30 is constructed with its sides formed into generally triangular shapes. The lefthand triangle (FIG. 1) of rear arm 30 is composed of a pipe-shaped propeller shaft case 31 forming the bottom side, pipes 32 and 33 forming the other two sides, and a gear case 34 at the lower, rear, end. Inside gear case 34, there is mounted a large reduction gear (not shown), which is driven by a propeller shaft 35 that extends inside propeller shaft case 31 (see FIGS. 3 and 4). The front end of propeller shaft 35 constitutes a universal joint 36, at which location the propeller shaft case 31 is expanded.

On the other side of the motorcycle, the righthand triangle of rear arm 30 is composed of a pipe 37 forming the bottom side and pipes 38 and 39 forming the other two sides (see FIG. 2).

At the front end portion of the propeller shaft case 31, as is apparent from FIGS. 3 and 4, a bracket 40 having a channel-shaped cross-section is connected, such as by welding, to the wall of case 31. To the front end portion of the pipe 37 constituting the bottom side of the aforementioned righthand triangle, on the other hand, connected, such as by welding, there is an extending plate 41 which extends forward. Bracket 40 and plate 41 are firmly connected to each other by means of a bracket 42, while still leaving such a length at their front ends as can receive bearing pipe 13. To bracket 42, there are welded pipes 32 and 38. To bracket 40, there is fixed, such as by welding, a flanged nut 43. The center line of nut 43 intersects the universal joint 36.

Inside bearing pipe 13, there is mounted by two needle bearings 44 a pivot shaft 45, through which a bolt 46 extends. It is inserted from the extending plate 41 side of the aforementioned rear arm 30. Bolt 46 is screwed into nut 43. On the right and left ends of the bearing pipe 13 there are mounted two oil seals 47.

At the front end of the propeller shaft case 31, there is arranged the output shaft (not shown) of the aforementioned engine 20, which is connected to the universal joint of the propeller shaft 35. Between the front end of propeller shaft case 31 and the crankcase, a dust cover 49 with a bellows shape is mounted.

In FIG. 4, reference numeral 50 indicates a pipe which is fixed through the aforementioned pair of brackets 11. On both ends of pipe 50, there a main stand 51 is swingably mounted by a bolt 52 extending through the pipe 50 and a nut 53. Parts of stand 51 are omitted from the drawings.

In FIGS. 1 and 2, reference numeral 60 indicates a shock absorber with a damper. Shock absorber 60 is mounted between a bracket 61, which is fixed to the front end of the shock absorber mounting chamber 5 of the aforementioned main frame 1, and the top 30a of the aforementioned rear arm 30.

In FIG. 1, reference numerals 62 and 63 indicate a fuel tank and a driver's seat, respectively.

In the embodiment as described, when the rear wheel moves up and down, the rear arm 30 swings about the pivot shaft 45. In accordance with this, the shock absorber 60 jointed to the top 30a is extended and contracted. By this extension and contraction of the shock absorber 60, the vertical vibrations of the rear wheel 29 are absorbed.

Although, in the embodiment thus far described, the propeller shaft case 31 is pivotally supported on the pivot shaft 45 through bracket 40, it is apparent that the present invention is not to be limited to the specific construction, but can be modified to a construction in which nuts or the like are fixed directly to case 31 so that the latter 31 may be pivotally supported on the pivot shaft 45, and still remain within the scope of the invention. Since the construction is made so that the rear arm 30 is not pivotally supported in a held manner from both sides, adjustment of the widthwise position of the rear arm 30 is not required during assembly.

As has been described, in a motorcycle of the shaft drive type in which the engine output is transmitted to the rear wheel shaft through the propeller shaft as shown, because the bearings connecting the rear arm holding the rear wheel rotatably to the motorcycle frame are arranged inside of the propeller shaft, the supporting member (the bearing pipe 13 in the foregoing embodiment) can be integrally mounted without having to be divided into right and left halves. It therefore becomes unnecessary to increase the strength of the frame in the vicinity of the bearing portion of the rear arm, especially, its widthwise strength, as much as in the prior art. Since there is no bearing outside of the motorcycle body, the width of the body can be reduced.

This invention is not to be limited by the embodiment shown in the drawings and described in the description which is given by way of example and not of limitation, but only in accordance with the scope of the appended claims.

We claim:

1. Rear arm bearing structure for a motorcycle of the type which has a frame with two laterally spaced-apart brackets, and a rear arm structure for supporting a rear wheel, said rear arm structure on one side of said motorcycle including a propeller shaft case enclosing a propeller shaft for driving said rear wheel and having a universal joint, and on the other side a rigid member, said bearing structure comprising: a bearing pipe fixed rigidly to said brackets and having an axis intersecting said universal joint, a pivot shaft inside said bearing pipe; bearing means between said bearing pipe and pivot shaft whereby said pivot shaft is rotatable around said bearing pipe axis; a bolt passing through said pivot shaft connecting said propeller shaft case and said rigid member to said pivot shaft for rotation therewith, said propeller shaft and case being disposed laterally outward from said bearing structure.

2. Structure according to claim 1 in which said rear arm structure includes a pair of rigid members and said case on said one side, and three rigid members on said other side, straddling said rear wheel.

3. Structure according to claim 1 in which said bearing structure is eccentrically located laterally on said frame relative to its centerline to permit said case to approach said frame.

4. Apparatus according to claim 3 in which said spaced-apart brackets are joggled to provide at said one side a recess to receive a portion of said propeller shaft case.

5. Structure according to claim 4 in which said rear arm includes a pair of rigid members and said case on one side, and three rigid members on the other, straddling said rear wheel.

* * * * *